United States Patent
Biber

[11] 3,953,885
[45] Apr. 27, 1976

[54] ELECTRONIC SOUND MOTION PICTURE PROJECTOR AND TELEVISION RECEIVER

[75] Inventor: Conrad H. Biber, Needham, Mass.
[73] Assignee: Polaroid Corporation, Cambridge, Mass.
[22] Filed: Sept. 3, 1974
[21] Appl. No.: 502,449

[52] U.S. Cl. ............................................. 358/54
[51] Int. Cl.² ........................................ H04N 9/11
[58] Field of Search............. 178/DIG. 28, 7.1, 7.2, 178/6.7 A, 6.7 R; 358/54, 4–7, 9, 67; 179/100.3 B, 100.3 K

[56] References Cited
UNITED STATES PATENTS

| | | | |
|---|---|---|---|
| 2,912,487 | 11/1959 | Horsley | 178/DIG. 28 |
| 3,116,364 | 12/1963 | Moore | 358/67 |
| 3,210,462 | 10/1965 | Trott | 178/7.6 |
| 3,506,778 | 4/1970 | Gold et al. | 358/5 |
| 3,522,371 | 7/1970 | Goldmark | 178/6.7 A |
| 3,621,121 | 11/1971 | Eckenbrecht | 178/DIG. 28 |
| 3,774,999 | 11/1973 | Ivester et al. | 352/12 |
| 3,778,545 | 12/1973 | Metzger | 178/7.2 |
| 3,814,846 | 6/1974 | Snow | 178/7.1 |
| 3,830,972 | 8/1974 | Siverling | 178/7.1 |

*Primary Examiner*—Robert L. Richardson
*Attorney, Agent, or Firm*—E. A. H. Hopkins

[57] ABSTRACT

A color television receiver and sound motion picture projector, using a one-gun sequential phosphor stripe receiving tube for display, and a common audio output amplifier and speaker for sound presentation, in which a strip of sound motion picture film bearing a recorded sound track is moved at constant speed relative to a synchronization station, a video signal generating station and a sound station to produce a set of signals that may be selectively applied to the output video amplifier, the audio amplifier, and the horizontal and vertical deflection systems of a color television receiver by manually operable switching means for selectively connecting the system as a television receiver, or interrupting the signals normally derived from the tuner of the receiver and substituting mutually compatible, but differently timed, signals produced from the film.

23 Claims, 12 Drawing Figures

FIG. 2

ELECTRONIC SOUND MOTION PICTURE PROJECTOR AND TELEVISION RECEIVER

This invention relates to audiovisual apparatus, and particularly to a novel combination color television receiver and sound motion picture projector.

Extensive efforts have been made to develop sound motion picture apparatus suitable to amateur use. A large number of expedients have been proposed, and diverse systems have been developed, but as a practical matter, most of the apparatus now available for the purpose makes use of film in the super-8 format, on one edge of which a sound track is recorded. Projectors for reproducing sound motion pictures recorded on this medium conventionally make use of sprocket holes provided along one edge of the film to stop the film at a projection gate once for each recorded image, then advancing to the next frame, at frame rates of from 18 to 24 per second.

In order to reproduce sound recorded on the film, a capstan is provided for moving the film past a sound transducer at uniform speed. A film loop is formed in some fashion between the sound station and the projection gate, so that the incremental motion at the projection gate is effectively isolated from the uniform motion desired at the sound station. Not only does this approach require a dual drive system, but if wow and flutter levels in the reproduced sounds are to be kept at acceptable levels, the apparatus becomes complex and expensive. And, with the best of equipment, the incremental advance of the film results in a characteristic projector noise that is acceptable only because it has always been associated with home movies.

In contrast, the familiar television set produces a professional sound motion picture in color, from a broadcast television signal. When the receiver is properly adjusted, the presentation is soundless except for the sound which is intended to accompany the picture.

It has of course occurred to others, prior to this invention, that these audiovisual display properties of the television receiver would be well adapted to the production of amateur sound movies. For example, in U.S. Pat. No. 3,506,778, issued on Apr. 14, 1970 to Nathan Gold, Lawrence K. M. Ting and Richard F. Weeks for COLOR TELEVISION SYSTEM, and assigned to the assignee of this application, a color television system adapted to produce motion pictures is disclosed.

The system described in the above patent has as one objective to leave the basic television receiver unmodified. The reason is that television receivers comprise extremely complex and highly specialized circuits designed to cope with signals broadcast to rigidly specified standards. Regardless of the particular details of a conventional color television receiver, it must be adapted to receive a standard signal, either in black-and-white or in color, comprising a carrier frequency, peculiar to each assigned channel, on which sound, picture and synchronization signals are modulated in a precisely prescribed manner and at particular assigned frequencies. The result is that the color television system described in the above-cited patent, as well as others which have been proposed, typically comprise a camera chain resembling a miniature television broadcasting station. In particular, in order to use a television receiver without any modification, it is necessary to provide a signal that can be coupled to the antenna terminals. The required signal need not be at a high power level, but otherwise essentially comprises a conventional television broadcast signal at an acceptable carrier frequency that can be substituted at the antenna terminals for a broadcast signal.

A characteristic requirement of a system of this kind, as discussed in the above-cited patent, is that the scanning constants of the television btoadcast signal must be maintained. For example, as described and discussed in considerable detail in the *Television Engineering Handbook*, edited by Donald G. Fink and published in 1957 by the McGraw-Hill Book Company, Inc., the U.S. standard is 525 lines per frame, interlaced with two fields per frame, at 30 frames per second.

On the other hand, it is desirable for amateur photography to photograph at the rate of somewhere between 18 and 24 frames per second. The lower limit is set by the flicker threshold; flicker becomes disturbing below eighteen frames per second. The upper limit, used for professional filming, is rarely exceeded, except for special purposes such as slow motion photography, for reasons of film economy.

The usual solution to this problem is to scan each frame of the motion picture electronically a number of times, at an appropriate rate to produce a video signal which can be interlaced at the proper frame rate for application to a television receiver. The simplest way to do this is to lower the filming rate to an integral submultiple of the television frame rate. For example, in the approach suggested in the above-cited patent, a filming rate of 15 frames per second is used. Each frame is scanned 4 times to achieve the necessary 60 field per second scanning rate for a proper interlace. While this method is readily implemented, 15 frames of new information per second are really not enough to adequately present movement. A second approach, used in professional camera chains, is to film at 24 frames per second, and to scan alternate frames a different number of times. Thus, one frame is scanned with two television fields, the next frame with three fields, and so on. This approach is discussed in more detail in the above-cited *Television Engineering Handbook*. It requires complex synchronizing equipment. And either approach inherently requires a full frame scanning capability, whether by flying spot scanner, a diagonal slit scanner, as described in the above-cited patent, or by an image orthicon, vidicon or other television camera tube. One object of this invention is to permit the use of a simple scanning system, in which only the film moves during scanning, and in which the film can move at a constant rate. The attainment of this object has the immediate advantage of making it much easier to reproduce sound recorded on the film with good fidelity, without the use of a separate drive and synchronization system.

A second object of the invention is to improve the resolution and fidelity with which color motion pictures can be projected. This object is in part attained by matching the film projection speed to the film exposure speed, so that all the useful information on the film can be utilized at the lowest possible scanning rate. A significant additional contribution to improved fidelity is attained by matching the color-recording mechanism of the film to the receiver tube type.

The above and other objects of the invention are attained by a novel combination color television receiver and sound motion picture projector making use of a strip of motion picture film of the type employing longitudinal filter stripe triplets. While either positive or negative transparency images on the film can be projected, by suitable modification of the video amplifier, it is preferred to employ film which upon processing produces an additive color negative transparency. Sprocket holes are formed along one side of the film in a conventional manner, and a magnetic sound track may be provided on one or both sides of the film strip. Preferably, a constant frequency pilot tone signal is recorded together with the audio signal at a frequency sufficiently high that it can be filtered out of the audio signal without materially compromising the bandwidth of the reproduced sound.

The film is arranged to be disposed on supply and takeup reels, as in a magnetic tape cassette, or the like. Apparatus is provided for driving the film at constant speed past a synchronization station, a video station and an audio station.

At the audio station, the pilot signal is separated from the sudio signal, and is used to control the speed of the film, in combination with an oscillator operating in an essentially fixed frequency, so that continuous film movement is provided. By this arrangement, a considerable measure of compensation for wow and flutter is also inherently achieved.

The television receiver preferably is of the type comprising a sequential single gun, vertically masked receiving tube, having conventional horizontal and vertical deflection systems and a single video output amplifier. Tubes of the preferred type have a screen comprising vertically arranged stripes of phosphor triplets sequentially emissive of red, green and blue light. Such a receiver conventionally comprises means for synchronizing the distribution of red, green and blue video pulses across the face of the screen in time with the arrival of the beam at the corresponding phosphor stripes.

Switching means are provided to disconnect the signals normally applied to the deflection systems and to the audio and video output amplifiers of the receiver, and to substitute signals formed in response to information recorded on the film. Basically, the horizontal deflection system is synchronized by controls responsive to beam positions in the tube, in a conventional manner. Vertical deflection is synchronized with the film by the detection of sprocket holes in the edge of the film, so that the display of each frame can begin at the appropriate edge of the frame as determined by the location of the sprocket hole. In this manner, some degree of independence between the raster on the tube and the speed of the film can be allowed, so long as the two are kept fairly close together by appropriate superirsory control, in a manner to be described.

The video station, located along the path of the film, comprises a slit source of light and a linear array of photodetectors connected in a capacitive storage matrix. The matrix confronts the source. The film passes between the matrix and the source, and thus stores a signal sequence representing transmissivities in a line across the film Sets of these signals are sequentially strobed out to the video amplifier under the control of a shift register.

Photoresponsive position detectors are mechanically connected to the photosensitive storage array, and respond to pre-exposed regions outside of the useful imaging area of the film to direct a servo-mechanism to lock the array into a predetermined relationship with the filter stripes on the film as it moves along. By this arrangement, the elements of the array are automatically kept in a predetermined red, blue and green sequence, so that they can be strobed to the video output amplifier in the correct sequence to register with the phosphor stripes on the screen of the receiver tube. By this arrangement, a very simple and efficient match can be attained between the film and the screen in the receiver tube, so that optimum utilization of the response characteristics of the film can be attained.

The manner in which the apparatus of the invention is constructed, and its mode of operation, will best be understood in the light of the following detailed description, together with the accompanying drawings, of the preferred embodiment thereof.

In the drawings,

FIG. 2 is a schematic block and wiring diagram of a control system forming a part of the apparatus of FIG. 1;

Figure 1:
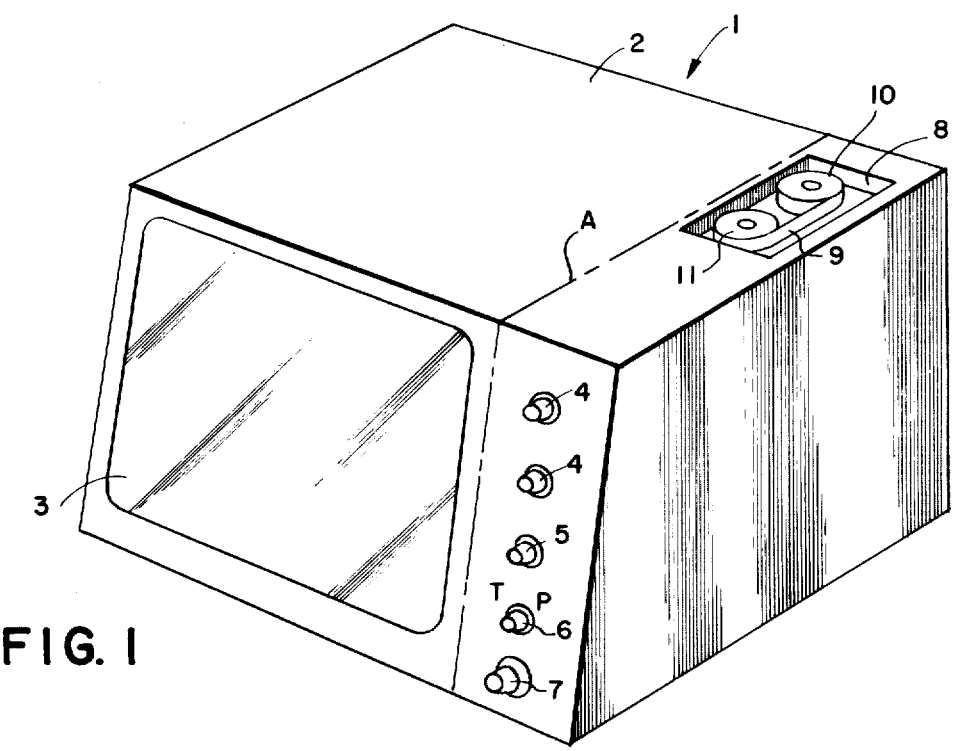
FIG. 1 is a schematic perspective sketch of a combined color television receiver and sound motion picture projector in accordance with the invention.

FIG. 1 shows a combination television receiver and sound motion picture projector generally designated 1, having a housing 2. The housing 2 may be enlarged somewhat over the size of the housing normally provided for a color television receiver, as illustrated by the portion to the right of the dotted line A, to accommodate the projection apparatus of the invention.

A safety glass window 3 in the console 2 exposes the face of the conventional sequential one gun television tube, to be described below. Any desired number of the usual conventional operator's controls may be provided on the front of the cabinet 2, as indicated at 4. These may include a conventional ON-OFF and volume control knob 5. An additional switch 6 is provided that has two positions, P and T. In the P position, a sound motion picture is produced, and in the T position, a conventional television program is received.

A conventional channel selector and fine tuning knob 7 is provided. Preferably, this knob controls a switch that has at least one extra position in addition to those selecting active broadcasting channels, so that the tuner can be effectively disconnected when the switch 6 is set to its P position to keep spurious radiation within the receiver to a minimum.

In the top of the console 2 there is provided a well 8, such as that conventionally provided in a tape deck for the reception of a magnetic tape cartridge, which is adapted to receive a strip of film 9 disposed on a supply reel 10 and a takeup reel 11.

Figure 2:
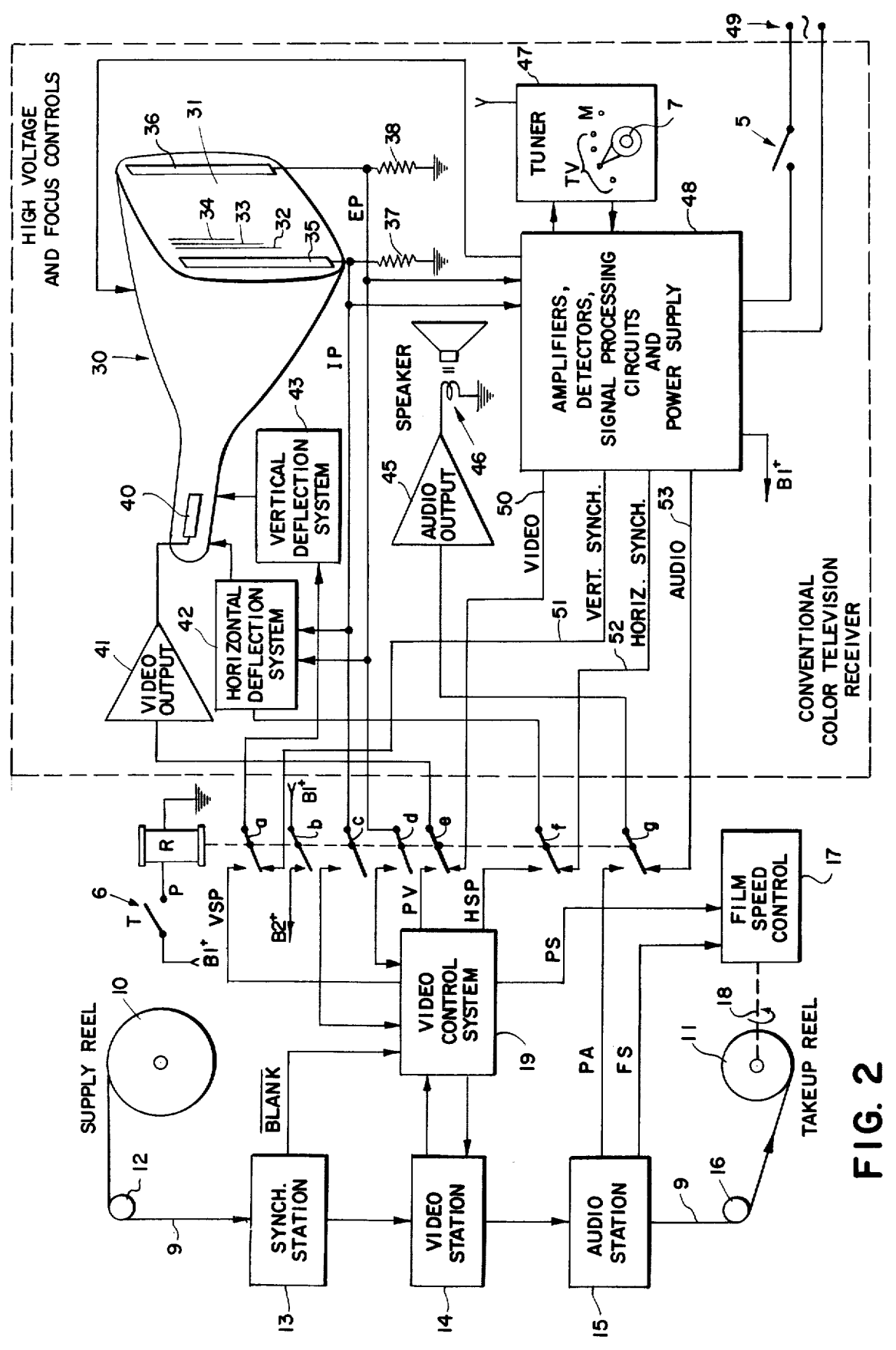

Referring next to FIG. 2, film passes from the supply reel 10, preferably around an idler 12, not shown in FIG. 1, and thence through a synchronization station 13, a video station 14, an audio station 15, and over a second idler 16 to the takeup reel 11. The idlers 12 and 16 are preferably provided in order to keep the film path the same between them as the film builds up on the takeup reel and dwindles on the supply reel.

The takeup reel 11 is adapted to be driven by film speed control means 17, to be described in more detail below, by means of an output shaft 18 coupled to the takeup reel. Conventional rewind and fast forward controls and drive apparatus may obviously be provided, but since these may be of conventional nature and are not necessary to the understanding of this invention, they will not be described.

Apparatus, to be described below in more detail, at the synchronization station 13 produces a signal labeled $\overline{BLANK}$ that is positive with respect to ground between sprocket holes in the film 9. This signal goes to ground during intervals in which sprocket holes are passing the synchronization station.

The $\overline{BLANK}$ signal is the primary synchronizing control signal for the vertical scanning system, and performs other functions to be described. It is illustrated as applied to a video control system 19, to be described in more detail below. As schematically indicated in FIG. 2, the video control system exchanges information with the video station 14. At the station 14, a line of video information is developed for each line to be displayed.

As schematically illustrated in FIG. 2, the apparatus is adapted for use with a conventional color television receiver of the type employing a single gun receiving tube 30. The tube 30 has a screen 31 on which are arranged a series of triplets of phosphors 32, 33 and 34 closely spaced in an array across the face of the screen, and extending vertically from top to bottom. Such tubes are described, for example, in the above-cited *Television Engineering Handbook*. A modern commercial example of such a tube is the Trinatron, manufactured and sold by Sony Corporation of Tokyo, Japan.

The electron beam in a tube 30 of the type described must be modulated with video that is appropriately switched to sequentially present signals corresponding to the appropriate color to the successive red, blue and green phosphors 32, 33 and 34. For this purpose, the tube is conventionally provided with a vertical edge conductor strip 35, at the left of the tube as seen in FIG. 2, and a vertical conductor strip 36 at the right side of the tube. These conductor strips may be capacitively coupled to the electron beam to produce a signal marking the edges of the receiving tube structure and locating the beam relative to the particular colored phosphor stripes.

The conductor strip 35 is connected to ground through a resistor 37, and the conductor strip 36 is connected to ground through a fixed resistor 38. Accordingly, when the electron beam is deflected into intersection with the conductor 35, as it will be on horizontal retrace, a pulse IP is produced. The trailing edge of the pulse IP will occur when the beam leaves the conductor 35 and begins to sweep across the screen to the horizontal rising portion of the horizontal synch pulse. At the end of the line, the beam intersects the conductor 36, producing a pulse across the resistor 38 labeled EP. In the television receiving condition of the apparatus, these pulse are employed in the conventional manner to achieve synchronization of the color switching with the horizontal scan.

The tube 30 is provided with a single electron gun 40 of any conventional construction, which is controlled by a conventional video output amplifier 41. Horizontal deflection of the beam in the tube 30 is under the control of a conventional horizontal deflection system 42.

Because it is desired to scan the film for projection purposes at somewhat different rates than are required for use with a conventional television broadcast signal, the sweep generating circuits are preferably separately provided, as a part of the video control system 19, to be described. Accordingly, the horizontal deflection system 42 for purposes of the invention may be considered to comprise only the output power amplifier and the yoke.

Vertical deflection of the beam in the tube 30 is under the control of a conventional vertical deflection system 43. Because it is contemplated that the usual vertical size control, which in effect controls the duration of the vertical sweep pulse, will have sufficient range of adjustment to cope with synchronizing pulses either at the television rate of 60 per second, or at the desired motion picture projection rate of twenty per second, special circuits are preferably provided only for producing the synchronization pulses for the vertical deflection system. Accordingly, the vertical deflection system 43 may be assumed to comprise a saw tooth wave generator, synchronized by the applied pulses, as well as the output amplifier and yoke. Alternatively, if desired, a separate saw tooth generator can be provided to perform the vertical sweep generation function in the projection mode.

The television receiver is assumed to be provided with a conventional audio output amplifier 45 adapted to energize a conventional speaker 46. It is comtemplated that the volume control conventionally provided for this amplifier 45 can be used either for the projector or for television reception purposes.

The color television receiver comprises a conventional tuner 47. As noted above, the channel selector knob 7 is preferably provided with a number of positions, indicated as TV, in which commercial television channels are selected, and a position M used to disconnect the tuner from the antenna while the apparatus is being used as a projector.

The receiver comprises conventional amplifiers, detectors, signal processing circuits and power supply circuits generally indicated by the block 48. The power supply is preferably augmented somewhat to supply the additional power necessary to operate the projector apparatus to be described, and for this purpose is arranged to produce a supply voltage at B1+ for application to other circuits. The power supply is energized in the conventional manner from line voltage terminals 49, assumed to be connected to a suitable source of alternating circuit, such as a conventional 110 volt 60 Hz supply, when the ON-OFF switch 5 is closed.

The circuits 48 respond in any conventional manner to signals from the tuner 47 to produce a video signal on the lead 50, appropriately synchronized, by use of the pulses IP and EP, in any conventional manner so that it is switched to correspond in color output to the phosphor masks 32, 33 and 34 as the beam sequentially engages them in passage across the screen 31. Similarly, conventional circuits in the block 48 produce vertical synchronization pulses on a lead 51, and horizontal synchronization pulses on a lead 52. As noted above, the vertical synchronization pulses are preferably the timing pulses which mark the beginnings of horizontal rise, whereas the horizontal signals are the triangular sweep signals generated by a conventional horizontal sweep generator in response to synchronization pulses taken from the signal received by the tuner 47. An audio signal output is produced on a lead 53 in any conventional manner.

The mode of operation of the system of FIG. 2 is determined by the position of the switch 6. As indicated, when the switch 6 is closed in its P position, a circuit is completed from the supply terminal at B1+, and thence through the winding of a conventional relay R to ground. The relay R controls a number of contacts $a$ through $g$.

When the relay R is de-energized, circuits are completed over its back contacts which in effect place the color television receiver in its conventional color television reception condition. When the relay R is energized, circuits are completed over its front contacts which convert the system for use in projecting a sound motion picture.

In the de-energized condition of the relay R, a circuit is completed over its back contact $a$ from the lead 51, on which the vertical synch pulses appear, to the vertical deflection system 43. Front contacts $a$ through $g$ of the relay R are open at this time. A circuit is completed over back contact $e$ of the relay R between the video output lead 50 and the video output amplifier 41. A circuit is completed over back contact $f$ from the terminal 52, on which the horizontal synch pulses appear, to the horizontal deflection system 42. A circuit is completed over back contact $g$ of the relay R to supply the audio signal on the lead 53 on the audio output amplifier 45.

When the relay R is energized, a circuit is completed over its front contact $a$ to supply vertical synch pulses VSP to the vertical deflection system 43 from the video control system 19. A circuit is completed over front contact $b$ of the relay R to supply the terminal supply voltage at the potential B1+ to the projection apparatus as a supply voltage labeled B2+, which is simply distinguished from B1+ to indicate that it is present only when the relay R is energized. While not explicitly described, it is apparent that various other positive or negative potentials that might be required in the projection apparatus could similarly be provided from the power supply when the relay R is energized.

Circuits are completed over front contacts $c$ and $d$ of the relay R to supply the pulses IP and EP to the video control system 19 for synchronization and control purposes to be described below. Front contact $e$ of the relay R completes a circuit to supply projected video signals PV to the video output amplifier 41. A circuit is completed over front contact $f$ of the relay R to supply horizontal synch pulses HSP, produced by the video control system in a manner to be described, to the horizontal deflection system 42. A circuit is completed over front contact $g$ of the relay R to supply projector audio signals PA to the audio output amplifier 45.

The projection apparatus to be described is operative when the supply potential B2+ is present. Under these conditions, the video control system 19 supplies a regulating signal frequency PS, that is approximately constant, to the film speed control 17. The signal PS is there compared with a pilot signal FS derived from the signal recorded on the film strip 9. The signals PS and FS control the shaft 18 to cause the speed of the film 9 to be essentially constant, and regulated relative to the frequency of the oscillator that determines the horizontal sweep frequency.

Figure 3:
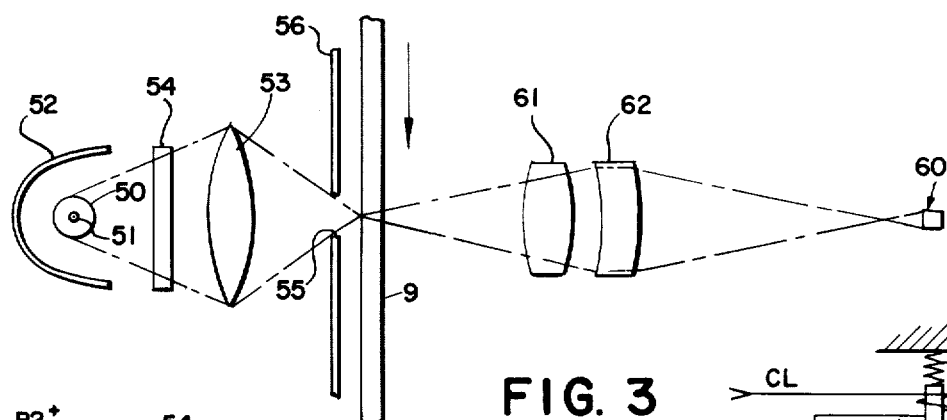
FIG. 3 is a schematic plan sketch, with parts omitted and parts broken way, illustrating a video scanning station forming a part of the apparatus of FIGS. 1 and 2.
Figure 4:
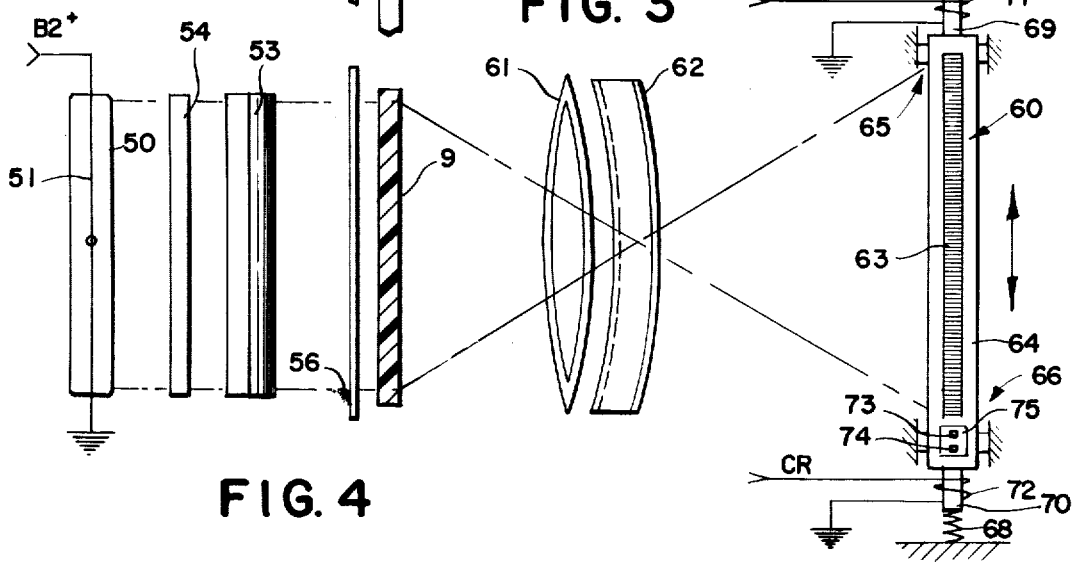
FIG. 4 is a schematic cross-sectional elevational view of the apparatus of FIG. 3, with parts added and parts shown in cross-section.

Referring next to FIGS. 3 and 4, the apparatus located at the video station 14 in FIG. 2 will next be described. This apparatus includes a slit source of light. Light for this source is supplied by an elongated lamp 50 having a filament 51 that is energized when the relay R is energized by a circuit extending from the projector supply terminal at B2+ through the filament 51 to ground. The lamp 50 is preferably supplied with a parabolic reflector 52, as indicated in FIG. 3, that directs light from the lamp 50 onto a lens 53 through a conventional diffuser 54, of frosted glass or the like.

Light from the lamp 50 is focused by the lens 53 onto an image formed on the film 9 through an elongated slit aperture 55 formed in a mask 56. An enlarged image of the line on the film illuminated by the slit source is focused on a linear photodetector array 60 by a conventional lens system, here shown as a pair of lens elements schematically indicated at 61 and 62.

The photodetecting array 60 may be a conventional self-scanning linear array of silicon photodiodes. In particular, for use with the film to be described, the array preferably includes 768 discrete and mutually insulated photodiodes 63 arranged in a continuous linear array. Such an array may be made in the same manner as a conventional RL 512 line scanner such as made by Reticon Corporation of 365 Middlefield Road, Mountain View, Calif.

The photodiodes 63 are preferably on centers one thousandths of an inch apart, in which case the lenses 61 and 62 are arranged to produce an image 3 times the size of the slit illuminated by the source 50 when additive film or the type to be described is employed using filter arrays of filter elements each 0.0003 inch wide. As schematically indicated in FIG. 4, the array 60 is mounted on a support 64 slidably mounted in guides 65, 66 for translation in the direction of the arrows.

The support 64 is resiliently constrained by a pair of resilient elements, here shown as springs 67 and 68. These springs urge the support 64 toward a central position, and yet allow translation over a maximum range of, for example, three thousandths of an inch.

Ferromagnetic armatures 69 and 70 fixed to the ends of the support 64 engage the spring 67 and 68, and are wound with coils 71 and 72, respectively. The electromagnetic assembly so formed is used as a film tracking servomechanism for controlling the position of the support 64, and hence of the array 60, relative to the optical axis of the scanning system. This servomechanism is employed in a manner to be described to align the individual photoresponsive elements 63 with filter stripes of predetermined colors on the film 9 to fix the order in which red, blue and green signals are represented by the conditions of the photodetectors 63.

The coil 71 is arranged to be supplied at times with a current CL, which causes the support 64 to be raised as seen in FIG. 4. Similarly, the coil 72 is supplied at times with a current CR, which causes the array to move downwardly as seen in FIG. 4. Balancing of the currents CL and CR can thus control and determine the position of the individual photoresponsive elements 63.

A pair of additional photoresponsive elements 73 and 74 are mounted on the support 64 in predetermined relation to the photoresponsive element 63. A red filter 75 may be arranged to overlie these detector elements 73 and 74 if so desired, to limit radiation falling upon them to red light. If this filter 74 is employed, and a color negative material is used to form the film 9, a band at the edge of the film, seen by the elements 73 and 74, can be left unexposed. Accordingly, upon development, the unexposed band will transmit red, blue and green light through its several filter elements. The red filter 75 will function in this instance to allow only the red light to pass through the edge of the film onto the photodetecting elements 73 and 74. As will appear, these elements 73 and 74 are arranged to respond to the light passing through the edge of the film to control the currents CL and CR to balance the support 64 in a position in which the photoresponsive detector elements 63 are appropriately registered with correct ones of the filter stripes on the film. Once this registration is secured, a slight focusing adjustment of the lens system 61, 62, in any conventional manner, may be made to compensate for any swelling or shrinkage in the film that may occur because of variations in temperature of humidity.

Figures 5, 6:
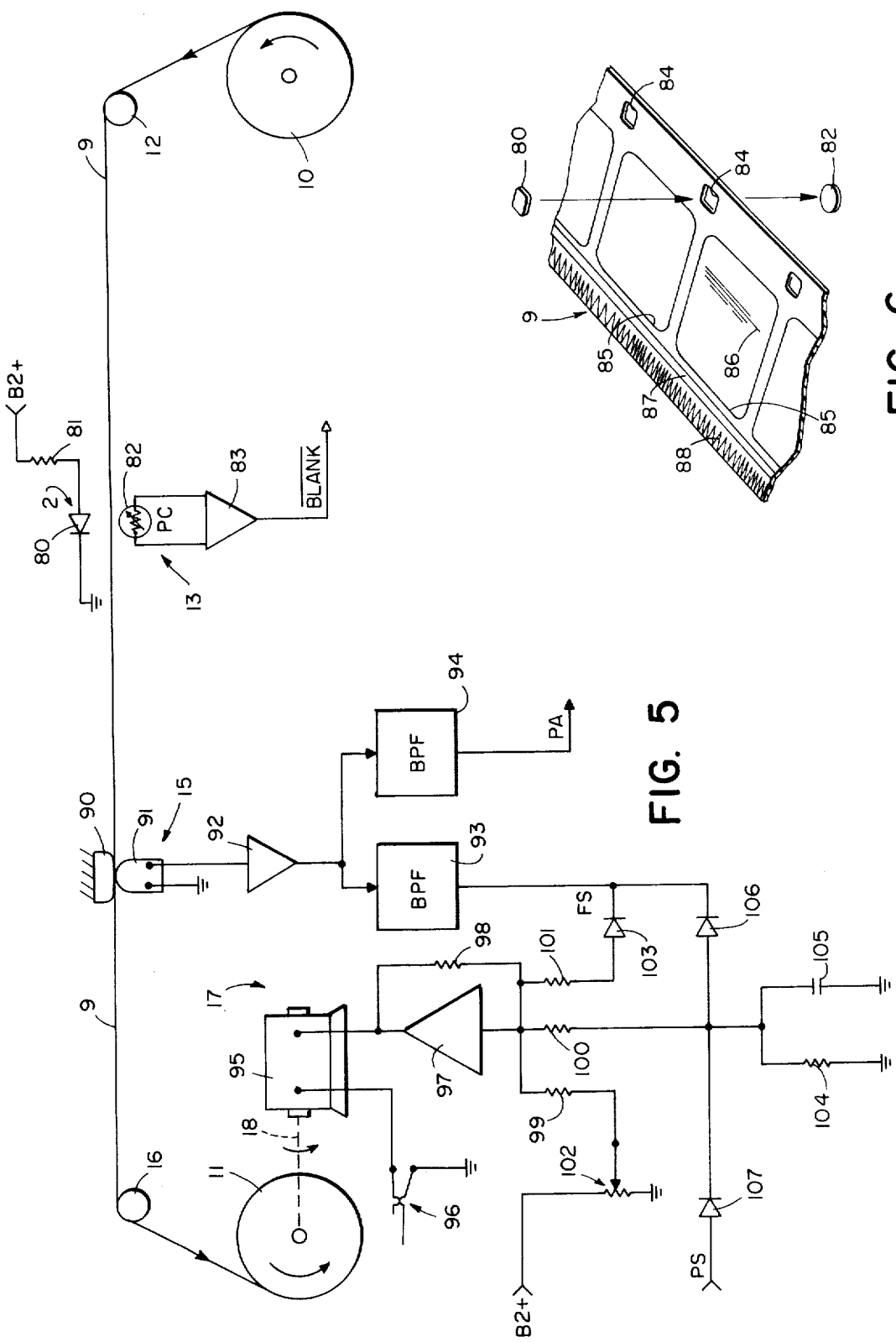
FIG. 5 is a schematic block and wiring diagram showing the film transport system and the audio and synchronization stations forming a part of the system of FIG. 2.
FIG. 6 is a schematic fragmentary perspective sketch of a portion of the film used in the apparatus of FIGS. 2 and 5, in its relation to the synchronization station in FIG. 5, illustrating the manner in which information is encoded on the film.

FIG. 5 shows further details of the film transport system, the film speed control 17, the audio station 5, and the synchronization station 13 forming a part of the apparatus of FIG. 2.

As shown, the synchronization station comprises a light-emitting diode 80 which is supplied with current from the supply terminal at B2+ through a resistor 81 when the relay R is energized and thereby applies the potential B2+ to the projection apparatus. Light from the diode 80 at times illuminates a photocell 82 connected in a conventional manner to an amplifier 83.

The amplifier 83 is arranged to produce a signal that is positive with respect to ground when the photocell 82 is not illuminated, and a signal that goes essentially to ground when the photocell is illuminated. As illustrated in FIG. 6, the photocell 82 is illuminated by the photo-emitting diode 80 when one of a series of sprocket holes 84 formed in the film 9 passes the location of the photocell and the light-emitting diode.

The sprocket holes 84 are formed along the edge of the film 9 in a conventional manner, and would be in the middle of the image frames such as indicated within the boundries 85 in the conventional super-8 format. Since the images are formed by advancing the film with the aid of the sprocket holes, each hole will have the same relationship to its associated frame regardless of its exact distance from the leading or trailing edge of the frame.

It will be apparent that, in the operation of the apparatus just described, as the film 9 passes along the linear path between the idlers 12 and 16, the amplifier 83 will produce a high signal, labeled $\overline{BLANK}$, between sprocket holes 84, and a low signal in which the signal $\overline{BLANK}$ is absent, when sprocket holes are passing the synchronization station.

As schematically indicated in FIG. 6, the film comprises narrow parallel filter elements 86 arranged to run linearly with the film and formed in a manner to be described. A band 87 on the edge of the film outside of the image area indicates that region of the film within which the photodetectors 73 and 74, described above, located the red filter elements as described. Outside of this band 87 is a track 88 of magnetic oxide material, on which a sound track can be recorded.

The audio station 15 comprises a conventional back-up pad 90 urging the sound track 88 on the film 9 against a conventional transducer head 91 to supply an audio signal to the input terminals of a conventional preamplifier 92. Band pass filters 93 and 94 receive the output signal from the amplifier 92, and separate out the film speed signal FS and the projector audio signal PA, respectively, in a conventional manner. In the particular embodiment here described, the signal SF may be assumed to be a constant frequency signal at 7500 Hz recorded on the film simultaneously with the sound signal. Such a signal may be separated from the projector audio signal without appreciably degrading the quality of the sound produced by a conventional television speaker.

The film speed drive shaft 18 is shown in FIG. 5 as comprising the output shaft of a conventional DC motor 95. The motor 95 has a control circuit that extends to ground through the contacts of a normally closed limit switch 96. The switch 96 is arranged to be opened when the film builds up sufficiently on the supply reel 11, and thus terminate projection operation near the end of the film.

The motor circuit continues from the switch 96 through the windings of the motor 95, and thence to the active output terminal of a conventional servomotor amplifier 97. The amplifier 97 is shown schematically as an operational amplifier having a feedback resistor 98 and three input summing resistors 99, 100 and 101.

The summing resistor 99 receives an input signal component from an adjustable potentiometer 102 that is energized by the supply terminal at B2+ when the relay R is energized. This component sets a nominal speed which the motor 95 attains by increasing in speed until the signal component is matched by a negative signal component supplied through the summing resistor 101 and a first isolating diode 103 from the active output terminal of the filter 93. It will be apparent that the component supplied through the diode 103 will be negative half cycles of the pilot signal FS.

Supervisory control of the nominal speed that would be attained by the compensator just described, if used alone, is attained by comparing the pilot frequency signal FS with an essentially fixed frequency reference signal PS in an averaging network. For this purpose, the signal FS is supplied through a second isolating diode 106 to the junction of the summing resistor 100 and a resistor 104 connected between that junction and ground. A filter capacitor 105 is connected across the resistor 104. A second input to the averaging network comprising the resistor 104 and the capacitor 105 is supplied through a diode 107 that receives the signal PS, developed in a manner to be described below. By this arrangement, the motor 95 will run at a speed appropriate to move the film 9 linearly along the path between the idlers 12 and 16 at a speed corresponding to the desired frame rate of 20 frames per second as directed by the master control frequency signal PS.

Figure 7:
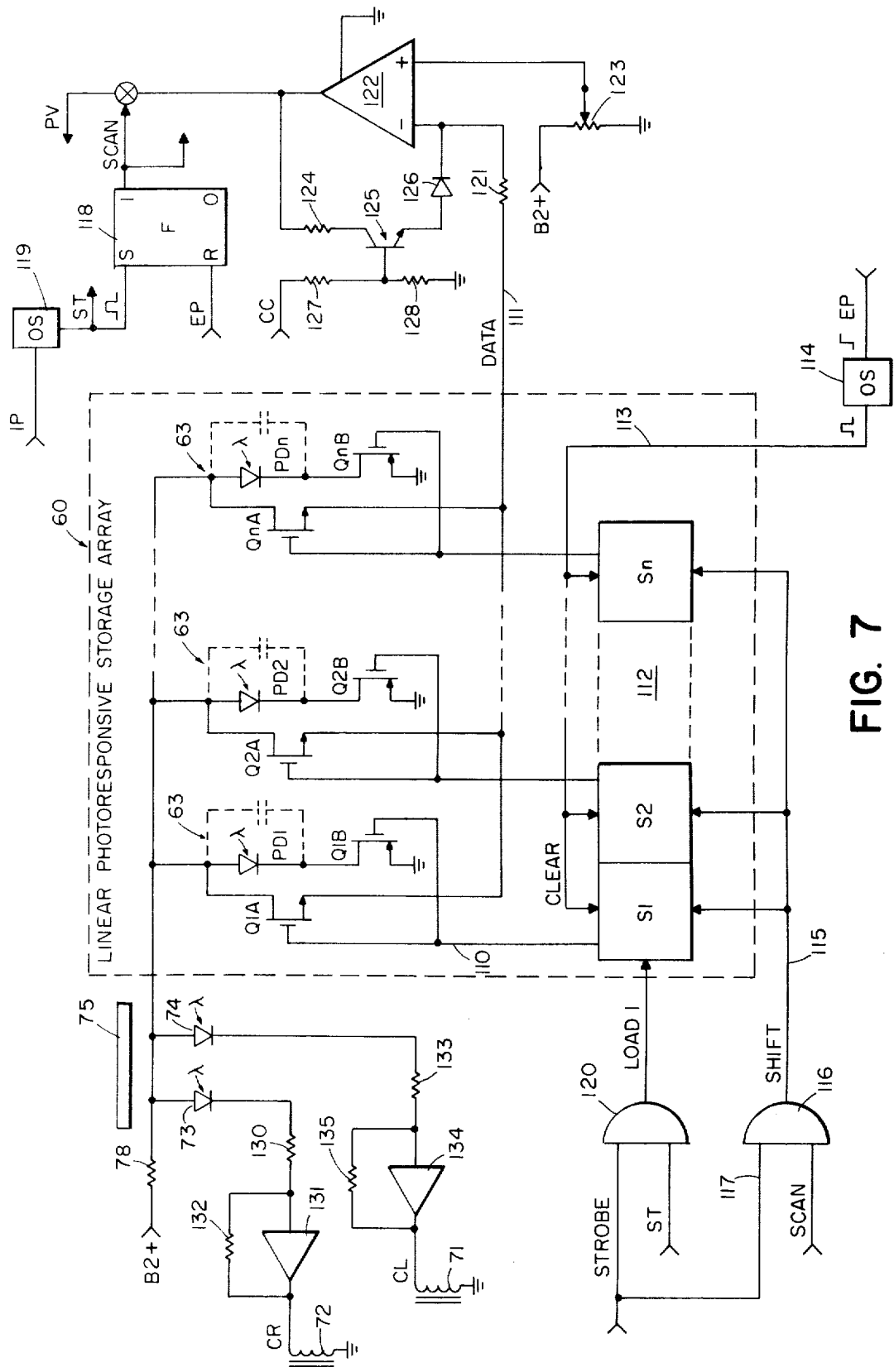
FIG. 7 is a schematic block and wiring diagram showing the video station of FIG. 2 in further detail.
Figure 8:
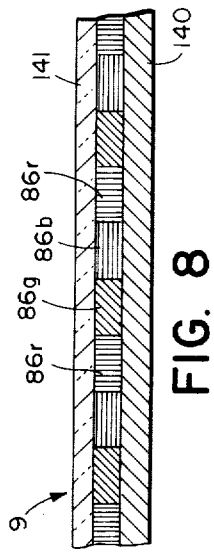
FIG. 8 is a schematic cross-section elevational sketch of a preferred film type useful in the apparatus of the invention.
Figure 9:
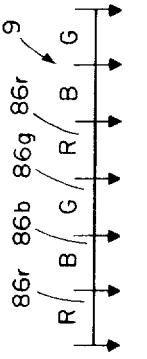
FIG. 9 is a schematic sketch illustrative of the operation of a servo-mechanism forming a part of the apparatus of FIGS. 3 and 4.

Referring to FIGS. 7, 8 and 9, the operation of the linear photoresponsive storage array 60 and its position determining servo-mechanism will next be described. Referring first to FIG. 7, the individual stages 63 of the photo-responsive arrays 60 each comprise one of a set of silicon photodiode, PD1 through PDn, there being 768 of these stages in the illustrative example here described. Each of the photodiodes PD1 through PDn has associated with it an effective shunt capacitance, illustrated as a capacitor shown in dotted lines connected across each of the photodiodes. The most sensitive response of a scanning array of this type is attained when these capacitances are utilized as a charge storage medium. The charges so stored are subsequently sequentially coupled to an output lead in a manner to be described.

For this purpose, each photodiode such as PD1 is provided with a pair of complementary field effect transistors such as Q1A and Q1B to control charge and discharge of the effective capacitance of the photodiode. As illustrated, the transistors Q1A and Q1B are of complementary types, such that when a predetermined base potential is applied to both transistors on a lead such as 110, one of the transistors is rendered conducting and the other is rendered nonconducting. In particular, with the construction shown, when the lead such as 110 is low, the transistor Q1B is conducting and the transistor Q1A is cut off, whereas when the lead 110 is high, the transistor Q1A is conducting and the transistor Q1B is cut off.

When the transistors 63, as Q1B are conducting, and the complementary transistors such as Q1A are cut off, the capacitance associated with each diode such as PD1 stores a charge determined by the amount of light falling on the photodiode. When the states of the transistors of one stage 73, such as the stage including the photodiode PF1, are subsequently reversed, with the transistors such as Q1A conducting, the charge stored on the capacitor associated with the photodiode PD1 is coupled to an output data lead 111.

The leads such as 110 on which the signals determining the states of the complementary transistors associated with each state 63 of the array 60 are each connected to a different one of the n output terminals of a conventional shift register 112 that may be formed as a series of 768 conventional flip-flops S2 through Sn integrated in a conventional manner on the same chip with the photodetector stages 63. It will be apparent that the output terminals of these stages to which the leads such as 110 are connected are required to swing from a potential above ground, to supply data to the lead 111, to a potential below ground by enough to turn on the transistors Q1B.

The shift register stages S1 through Sn are each arranged to be cleared by a CLEAR pulse that is positive with respect to ground applied to a common terminal 113. The CLEAR pulse for this purpose is at times produced by a conventional one-shot multivibrator 114 when triggered at the trailing edge of the pulse EP produced at the end of each horizontal scanning line on the receiver tube 30 as described above in connection with FIG. 2.

The contents of the shift registers S1 through Sn are arranged in a conventional manner to be shifted one stage to the right each time a SHIFT pulse is applied to the registers over a common lead labeled 115. The SHIFT pulses are at times produced by a conventional AND gate 116 that is enabled when a signal labled SCAN is present at logic 1 and applied to one input terminal, and a STROBE pulse is applied to the second input terminal over a lead 117.

As illustrated in FIG. 7, the SCAN level is produced by a flip-flop 118 when the flip-flop 118 is set. The flip-flop 118 is arranged to be set at the trailing edge of each pulse IP by a one-shot multivibrator 119 that is triggered at this time. The SCAN level is thus set at each time a horizontal scanning level is started. The flip-flop 118 is reset by the pulse EP, produced when the beam reaches the end of its trace and encounters the conductor 36 in FIG. 2.

The occurrence of a STROBE pulse, produced in a manner to be described, together with a pulse ST, enable an AND gate 120 to produce a signal labeled LOAD 1 at logic 1 potential. This signal loads a one into the first shift register stage S1 to begin each horizontal scan. The pulse ST is produced by the multivibrator 119 at the beginning of the scan.

The logic one signal thus loaded into the first stage S1 causes a high to appear on the first lead 110, and thereby couples the photodiode PD1 to the video lead date lead 111. This signal represents the red intensity of the first image element in the line.

The logic one in the first stage is propagated down the register stages by sequential shift pulses, such that the contents of the photodiodes PD1 through PDn are sequentially sampled onto the data line 111 during each horizontal scan interval.

The video signal thus produced on the lead 111 is applied through a conventional summing resistor 121 to the inverting input terminal of a conventional operational amplifier 122. The noninverting input terminal of the amplifier 122 receives a bias signal from a potentiometer generally designated 123 that is energized from the supply terminal at B2+. This signal sets a reference level, and increasingly intense light on any of the photodetector stages 63 causes a signal of decreasing amplitude to be applied to the lead 111, driving the output signal of the amplifier 122 down away from this reference level. This mode of operation is preferred with a color negative material, in which the colors are correct but the light intensity transmitted varies inversely with the desired intensity. For use with positive transparency material, a signal increasing with light intensity would obviously be provided.

The amplifier at 122 is provided with a variable feedback path comprising a resistor 124 connected between the active output terminal of the amplifier 122 and the collector of a conventional NPN transistor 125. The emitter of the transistor 125 is returned to the inverting input terminal of the amplifier 122 through a voltage level setting diode 126. The effective impedance presented between the collector and emitter of the transistor 125 is determined by a bias signal applied to the base of the transistor through a potential divider comprising resistors 127 and 128 connected in series between a terminal which receives a color correcting signal CC, to be described, and ground. The color correcting signal CC is changed for each color to be addressed on the face of the tube 30, in a manner to be described, such that the correct intensity balance can be achieved for matching the response of the photodiodes to the response of the phosphors on the screen 31 of the tube 30.

The photoresponsive storage array 60 receives electric energy from the supply terminal at B2+ through a current limiting resistor 78. Current from the same source is applied to the anodes of the photodetectord photodetectors and 74 in the position control servomechanism for the array 60.

As shown, the cathode of the photodetector 73 is connected through an input summing resistor 130 to the active input terminal of an amplifier 131 that has a feedback resistor 132. The active output terminal of the amplifier 131 is connected through the winding 72 to ground. The output current from the amplifier 131 thus comprises the correcting current labeled CR in FIGS. 4 and 7. Similarly, the cathode of the photodiode 74 is connected through a summing resistor 133 to the active input terminal of an amplifier 134 that has a feedback resistor 135. The active output terminal of the amplifier 134 produces a current labeled CL that energizes the winding 71 on the armature 70 in FIG. 4.

Referring next to FIG. 8, the structure of the film 9 will next be described in somewhat more detail. This film may be manufactured in the manner described in U.S. Pat. No. 3,284,208 to Edwin H. Land, granted on Nov. 8, 1966 for PHOTOGRAPHIC PRODUCTS AND PROCESSES FOR THE PRODUCTION THEREOF, and assigned to the assignee of this application. As more fully described in that patent, the film 9 may comprise a transparent base layer 140 of any conventional material, on which there are formed narrow contiguous strips of filter material in stripes 86 running as shown in FIG. 6, which are successively red, green and blue, as indicated at 86r, 86g and 86b, respectively, in FIG. 8.

Overlying this layer of filter elements, which may each be approximately 0.0003 inch in width, is a panchromatic emulsion layer 141. It will be apparent that when exposed through the base layer 140, the panchromatic layer 141 will receive light in successively red, green and blue filtered stripes, and, when developed, will form a color negative of the additive type. A preferred material for use in this invention is described in copending U.S. application for Letters Patent Ser. No. 463,260, filed on Apr. 23, 1974 by Edwin H. Land for PHOTOGRAPHIC COLOR PRODUCTS AND PROCESSES, and assigned to the assignee of this application.

Comparing FIGS. 4, 7, 8 and 9, the position correcting photodetectors 73 and 74 are preferably spaced on the same centers as the photodetectors 63 of the array 60, or at an integral multiple of the same distance, and in linear registration therewith such that when the photodetectors 73 and 74 are directly opposite a blue filter stripe 86b and a green stripe 86g, respectively, on the film 9, the first photodetector PD1 of the array 60 will be opposite the red stripe, the second one will be opposite a blue stripe and the third will be opposite a green stripe.

FIG. 9 illustrates the situation in which the detectors 73 and 74 are out of registration, with the photodetector 73 being somewhat more in registry with the red stripe 86r than the detector 74, and accordingly producing a stronger signal CR. This stronger signal will cause the array to be shifted to the right in FIG. 9, until the photodetectors 73 and 74 are aligned with blue and green stripes, respectively, on the film 9. A position just exactly balanced between red exposure of 73 and red exposure of 74 is possible, but this is an unstable position and the slightest movement of the film will cause one photocell or the other to dominate, moving the array 60 either to the right or to the left to bring it into proper registration with the filter matrix. It will be apparent that very slight movements of the film laterally, or any tendency of the filter stripes on the film to be out of parallelism with the film itself, will be automatically corrected as the film moves through the apparatus, with the proper registration with the scanning array being preserved.

With reference to FIGS. 6 and 7, if it is desired to omit the filter 75, a negative film can be pre-exposed with green and blue light in the band 87, so that only the red filtered areas in the band will transmit. Alternatively, a positive film may be employed, such as those described in U.S. Pat. No. 3,536,488, granted on Oct. 27, 1970 to Edwin H. Land for MULTICOLOR SCREEN-CARRYING ELEMENT IN ADDITIVE COLOR PHOTOGRAPHIC PROCESSES, and assigned to the assignee of this application, and in U.S. application for Letters Patent Ser. No. 383,196, filed on July 27, 1973 by Edwin H. Land for PHOTOGRAPHIC PRODUCTS AND PROCESSES FOR FORMING SILVER AND ADDITIVE COLOR TRANSPARENCIES, and assigned to the assignee of this application. Such a positive transparency film may be pre-exposed in the band 87 with red light, and the filter 74 omitted.

It will be evident that in describing the photodetector positioning servomechanism, the color red has been described as the control color simply to avoid circumlocution. Obviously, filter stripes of any other color could be analogously employed.

Figure 10:
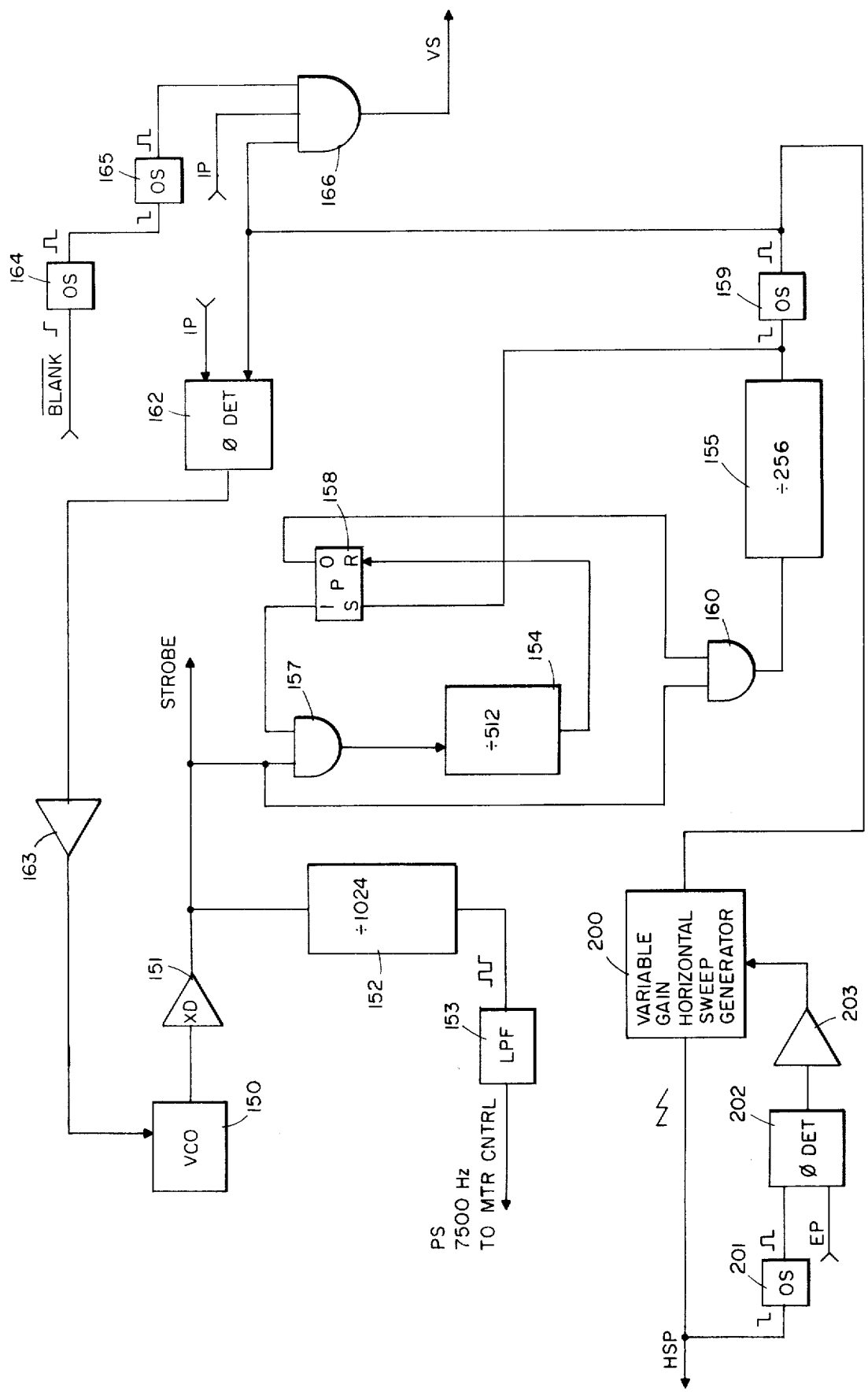
FIG. 10 is a schematic block and wiring diagram of a synchronization system forming a part of the apparatus of FIG. 2.

FIG. 10 illustrates the horizontal and vertical synchronization system, and the apparatus for generating the film speed control signal PS, comprising a portion of the video control system 19 in FIG. 2. The basic clock signal generator for the apparatus is a voltage controlled oscillator 150. The oscillator 150 preferably has a center frequency at the desired design video clock rate which can be varied slightly to allow for synchronization to the particular receiver tube screen in a manner to be described.

The output signal produced by the voltage controlled oscillator 150 may be, for example, 7.68 MHz. This signal is applied to a conventional zero crossing detector 151 to produce the STROBE pulses, which are utilized in the manner described above in connection with FIG. 7 to control video distribution. The STROBE signals, at a repetition rate of 7.68 MHz, are applied to a first binary counter 152, which comprises any conventional binary counter with 10 stages that produces an overflow transition each 1024 strobe pulses. This signal, filtered by a low pass filter 153, if desired, comprises the 7500 Hz signal PS for application to the film speed control unit 17 in FIGS. 2 and 5.

A pair of binary counters 154 and 155 are interconnected by gates to divide by 768. For this purpose, the counter 154 may be arranged to have nine stages and thereby divide by 512. This counter is stepped by logic 1 signals appearing at the output terminal of a conventional AND gate 157.

The gate 157 has two input terminals, one receiving the STROBE pulses, and the other being enabled when a flip-flop 158 is set. The flip-flop 158 has its logic 1 output terminal connected to the second input terminal of the gate 157 for this purpose.

The counter 155 is a conventional binary counter having eight stages and is thus arranged to divide by 256. An overflow pulse produced each time 256 input pulses are applied to the counter 155 is applied to set the flip-flop 158. The trailing edge of each overflow pulse from the counter 155 triggers a one-shot multivibrator 159 to produce an output pulse that serves as a horizontal synchronization pulse for the apparatus of the invention in its projection mode.

Overflow pulses produced by the counter 154 in response to 512 input signal pulses reset the flip-flop 158, and thereby enable an AND gate 160 that has one input terminal connected to the logic O output terminal of the flip-flop 158. The second input terminal of the gate 160 receives the STROBE pulses. When the flip-flop 158 is reset, and a STROBE pulse is produced, the gate 160 applies a counting pulse to the counter 155.

It will be apparent that by this arrangement the counter 154 is arranged to count the first 512 strobe pulses, the counter 155 counts the next 256 strobe pulses, and so on. A horizontal synch pulse is thus produced for each 768 strobe pulses.

With the super-8 film format assumed, there are approximately 672 active filter stripes on each image frame area in the horizontal direction across the film. Thus, 672 of the strobe pulses produced during each horizontal synch pulse interval are used for active image display, and the remainder are available for registration correction and horizontal blanking purposes.

Each horizontal synch pulse from the multivibrator 159 is compared with the pulse IP produced at the beginning of the screen trace in a conventional phase detector 162. The output of the phase detector 162, suitably shaped by a conventional amplifier 163, is applied to the voltage controlled oscillator 150 to adjust it so that the synch pulses HSP are properly phased relative to the pulses IP.

The $\overline{\text{BLANK}}$ signal, produced by the amplifier 83 in FIG. 5 in the manner described above, is applied to a one-shot multivibrator 164 in FIG. 10. The leading edge of the signal, produced at the end of a sprocket hole in the apparatus of FIGS. 5 and 6, triggers a multivibrator 164 to produce an output pulse. This output pulse is adjusted by appropriate design of the multivibrator 164 to have a duration equal to the interval between the end of the sprocket hole 84 in FIG. 6 and the beginning of the next image frame 85.

The trailing edge of the pulse from the multivibrator 164 triggers a multivibrator 165 to produce an output pulse having a duration sufficient to encounter a pulse HSP during the pulse IP. When that occurs, a conventional AND gate 166 produces an output synch pulse labeled VS that marks the beginning of a vertical scanning interval. If desired, this pulse may be applied to a conventional triggered blocking oscillator to produce a saw tooth vertical sweep pulse, or, if the vertical size control on the receiver is adaquate, it can be applied to that sweep generator in the manner described above.

As shown in FIG. 10, the pulses from the multivibrator 159 are applied to a variable gain horizontal sweep generator 200 to mark the start of each horizontal sweep pulse HSP in the projection mode. The trailing edge of each pulse HSP, which has a fall time corresponding to the horizontal retrace and blanking interval, triggers a one-shot multivibrator 201 to produce an output pulse that is compared with the pulse EP in a conventional phase detector 202. The output from the phase detector 202, suitably shaped in a conventional amplifier 203, is applied to control the gain of the sweep generator 200 to cause the sweep to begin retrace when the conductor 36 is encountered.

Figure 11:
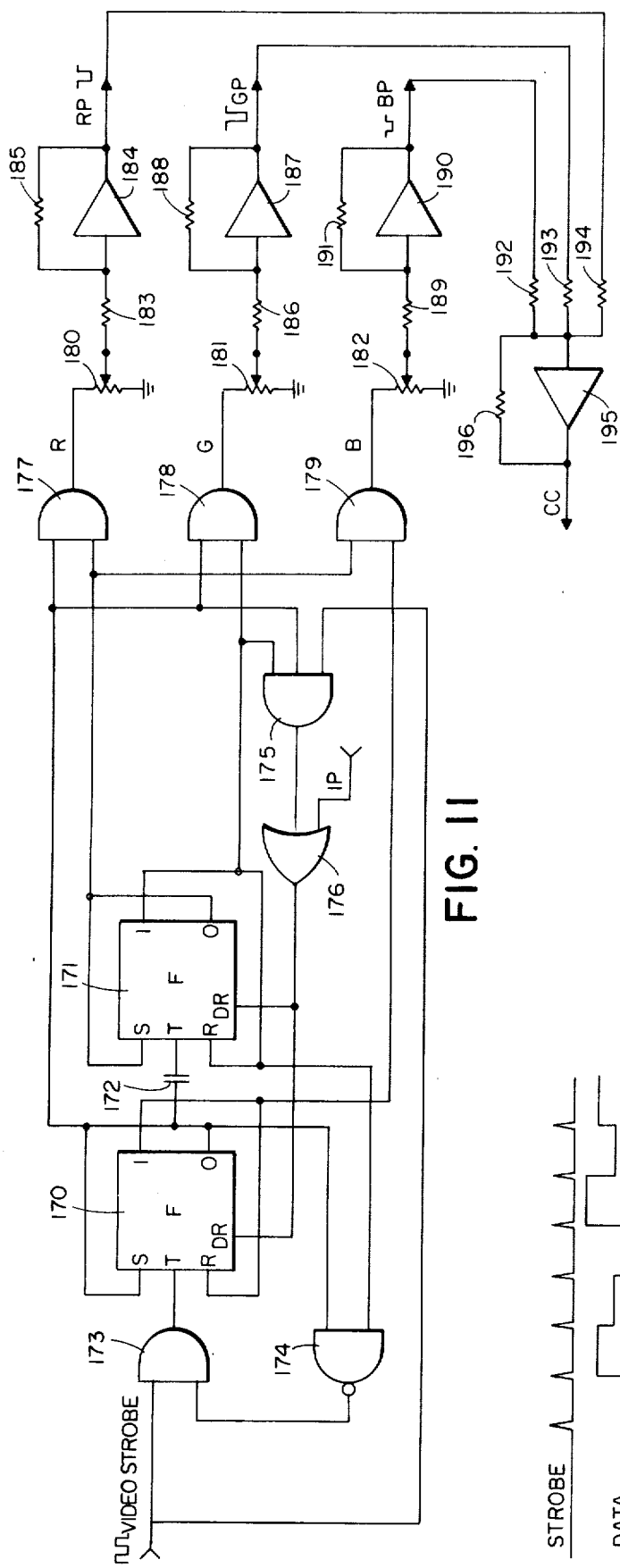
FIG. 11 is a schematic block and wiring diagram of the color signal balance generator forming a part of the system of FIG. 2.

FIG. 11 shows apparatus for generating the color control signal CC that is used to adjust the gain of the video pre-amplifier 122 in FIG. 7 in the manner described above. For this purpose, the video STROBE pulses, produced in the manner described above by the zero crossing detector 151 in FIG. 10, are applied to a counter which is gated to divide by three. Briefly, such a counter may be made from two conventional JK flip-flops 170 and 171, basically connected as a binary counter.

The first flip-flop 170 is provided with a conventional set gate input terminal S, a reset gate input terminal R, a direct reset input terminal DR, and a trigger input terminal T. The logic 1 output terminal of the flip-flop 170 is connected to the reset input terminal, and the logic O output terminal of the flip-flop 170 is connected to the set gate input terminal S.

Similarly, the flip-flop 171 has a set gate input terminal S, a reset input terminal R, a direct reset input terminal DR, and a trigger input terminal T. The logic 1 terminal of the flip-flop 171 is connected to the reset gate input terminal R, and the logic O output terminal of the flip-flop 171 is connected to the set gate input terminal S.

The trigger input terminal of the flip-flop S is connected to the logic 1 output terminal of the flip-flop 170 through a suitable coupling capacitor 172. The trigger input terminal of the flip-flop 170 is connected to the output terminal of a conventional AND gate 173.

One input terminal of the gate 173 receives the STROBE pulses, and a second input terminal of the gate 173 is connected to the active output terminal of a conventional NAND gate 174. The gate 174 has one input terminal connected to the logic O output terminal of the flip-flop 170, and a second input terminal connected to the logic 1 output terminal of the flip-flop 171.

The STROBE signals are also applied to one input terminal of a conventional AND gate 175. A second input terminal of the gate 175 is connected to the logic O output terminal of the flip-flop 170. A third input terminal of the gate 175 is connected to the logic 1 output terminal of the flip-flop 171.

It will be apparent to those skilled in the art that with this arrangement, when both of the flip-flops 170 and 171 are reset, the first strobe pulse applied to the gate 173 will cause the flip-flop 170 to be set. The second strobe pulse applied to the gate 173 will cause the flip-flop 170 to be reset, and as this occurs the rising transition at the logic O output terminal of the flip-flop 170 will trigger the flip-flop 171 through the capacitor 172 and set the flip-flop 171.

The gate 175 is now enabled by logic 1 signals appearing at the logic 1 output terminal of the flip-flop 171 and at the logic O output terminal of the flip-flop 170. At the same time, the NAND gate 174 produces a logic O output signal to disable the gate 173.

The output terminal of the gate 175 is connected to one input terminal of a conventional OR gate 176. The output terminal of the gate 176 is connected to the direct reset input terminals of flip-flops 170 and 171.

When the gate 175 produces a logic 1 output signal, as it will do at the next STROBE pulse, the gate 176 will thus produce an output signal to reset both of the flip-flops 170 and 171. The flip-flops will then go from count 1-0 to count 0-0 without going through the count 1-1, and accordingly, divide by three.

The pulse IP is applied to the second input terminal of the OR gate 176 to reset both flip-flops 170 and 171 each time a scan has begun. This operation causes the appropriate color sequence to be maintained.

The outputs of the flip-flops 170 and 171 are decoded by AND gates 177, 178 and 179 to produce sequential gate signals R, G and B, marking intervals of red, green and blue video presentation, respectively. The signals R, G and B from the gates 177, 178 and 179, respectively, are selectively attenuated by potentiometers 180, 181 and 182, respectively, to produce input signals of adjustable levels.

The signal from the potentiometer 180 is applied through a summing resistor 183 to the input terminal of a conventional amplifier 184 having a fixed feedback resistor 185. The amplifier 184 thus produces a negative output pulse labeled RP that has an amplitude dependent on the adjustment of the potentiometer 180.

Similarly, the signal from the potentiometer 181 is applied through a summing resistor 186 to an amplifier 187 having a feedback resistor 188 to produce a green signal correcting pulse GP of amplitude determined by the adjustment of the potentiometer 181. In like fashion, the signal from the potentiometer 182 is applied through a summing resistor 189 to the input terminal of an amplifier 190 having a feedback resistor 191 to produce a signal level BP.

The signal pulses RP, GP and BP thus sequentially produced are applied through summing resistors 192, 193 and 194, respectively, to the active input terminal of a conventional amplifier 195 having a feedback resistor 196. The color correction signal CC is thus produced as the sequential compsite of the pulses RP, GP and BP, successively adjusting the gain of the amplifier 122 in FIG. 7 to cause the correct response of the receiver taking into count the different spectral responses of the photodetectors to light of different colors. The potentiometers 180, 181 and 182 enable color balance and intensity adjustments to be made as desired, enabling the user to correct certain unbalances in the negative for light of the wrong color temperature, to match the response of the receiving tube to the response of the photodiodes of the film, and to correct for over or under exposure of the film.

Figure 12:
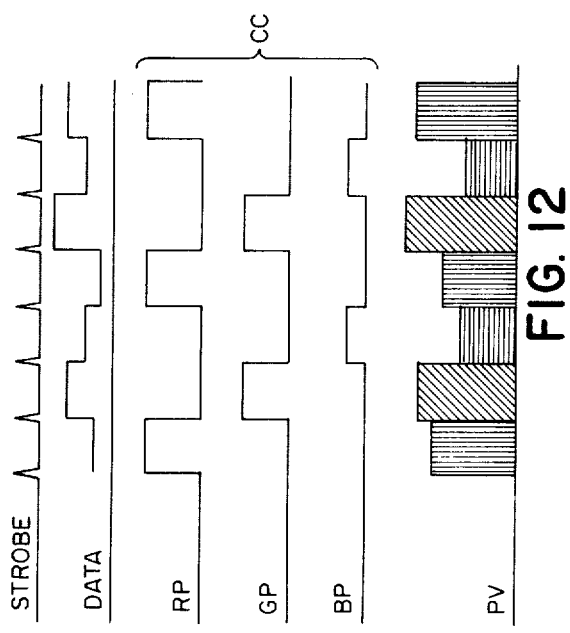
FIG. 12 is a schematic diagram of voltage versus time illustrating the formation of a video signal in accordance with the apparatus of the invention.

FIG. 12 shows the manner in which the video signal PV is built up from the DATA pulses appearing on the lead 111, under the influence of the STROBE pulses produced by the zero crossing detector 151 in FIG. 10 and the color correction signal formed from the signals RP, GP and BP as just described. In FIG. 12, for clarity, the signal CC is shown as its three independent components, the pulses RP, GP and BP as inverted by the amplifier 195. The successive levels of the signal PV are not to be interpreted as the sums of the DATA pulses and the appropriate pulse RP, GP or BP, but in each case as the amplitude of the DATA pulse times a gain factor determined by the amplitude of the corresponding pulse RP, GP or BP.

Having described the apparatus of the invention, its operation as a sound notion picture projector will next be described with reference to FIGS. 1 through 12. Operation of the apparatus as a television receiver, with the switch 6 in FIG. 1 in the T position and the channel selector knob 7 in a position selecting an active television channel, will not be described, as this operation is conventional.

With the switch 6 set to the P position, the raley R will be energized, and the signals developed by the circuits 48 from the tuner 47 will be interrupted. The projection system will accordingly apply signals to the receiver, and receive the signals RP and EP from the receiver, over the front contacts of the relay R.

Assume next that a film 9, disposed primarily on the supply reel 10, is in position, and the switch 5 is closed to allow power to be supplied to the apparatus. The relay R will now be energized. The power supply voltage at B2+ will be applied to the various circuits of the projection apparatus described above.

The motor 95 will begin to run, causing the audio signal developed by the transducer 91 from the sound track 88 on the film to be produced by the amplifier 92. The speed of the motor 95 will increase until the signal PS from the voltage controlled oscillator 150 in FIG. 10 is balanced by the negative signals produced from the pilot signal FS as reproduced by the band pass filter 93.

The level $\overline{BLANK}$ will sequentially be produced and removed by the amplifier 83 as sprocket holes are passed in the film. Depending on the exact orientation of the photodetectors 73 and 74 in FIG. 4 relative to the filter stripes on the film 9, one of the current signals CL and CR produced by the amplifiers 134 and 131 will be larger than the other, causing the support 64 for the array 60 to be moved laterally to adjust the photoresponsive array into registry with the filter stripes on the film.

As the film speed control pulls the film into synchronism with the rest of the apparatus, the rising transition at the beginning of the signal $\overline{BLANK}$ produced by the amplifier 83 (FIG. 5) will cause the one-shot multivibrator 164 (FIG. 10) to produce pulses at proper intervals to overlap with the pulses IP. During each such interval of overlap, one of the pulses produced by the multivibrator 159 will cause a vertical synch pulse VS to begin a vertical scan in registry with an image on the film. Initially, these pulses may be sufficiently out of synchronism so that no vertical sweep is initiated until reasonable synchronization is attained. That action will prevent the projection of distorted images on the film, and an adequate leader on the film may be provided to avoid wasting frames during this interval.

Relatively speaking, it will take considerably longer to bring the film speed into synchronism than it will to bring the horizontal sweep pulses into synchronism with the pulses IP and EP. Horizontal synchronization may occur within the first frame of operation of the apparatus. Once synchronization is attained, however, the operation will proceed with the projector sequentially projecting images on the receiver tube 30, will sound is simultaneously produced by the speaker 46. Because the film is moved continuously, the quality of sound output attainable would be considerably better than that expected from a projection system in which the sound is recorded on a film that is incrementally moved.

As the end of the film is approached, and film builds up into the takeup reel to the point where the limit switch 96 is opened (FIG. 5), the motor 95 will stop. The apparatus will stop projection and wait until the new film has been loaded, or until the switch 6 is moved back to the T position for the resumption of television reception.

While the apparatus of the invention has been described with respect to the details of a preferred embodiment, many changes and variations will occur to those skilled in the art upon reading this description. Such can obviously be made without departing from the scope of the invention.

Having thus described the invention, what is claimed is:

1. Apparatus for producing a video signal from a strip of color transparency film of the type comprising a repetitive series of parallel filter stripes of different colors, said apparatus comprising, means for moving the strip along a predetermined path in a direction parallel to said stripes, a linear photoresponsive array of signal generating means, one signal generating means for each of a set of said stripes, means mounting said array adjacent said path and perpendicular to said stripes, means for illuminating said array through said strip, means for detecting the order of registration of light through said stripes of different colors falling on the particular signal generating means of said array, and means for adjusting the position of said array relative to the strip to align filter stripes of a predetermined color with predetermined elements of said array.

2. Apparatus for producing a television signal from a sprocketed strip of additive color transparency film of the type comprising a repetitive series of parallel filter stripes of different colors and at least one sound recording track, said apparatus comprising, means for moving said strip along a predetermined path in a direction parallel to said stripes, a linear photoresponsive array of signal generating means, one signal generating means for each of a set of said stripes, means adjustably mounting said array adjacent said path and perpendicular to the direction of movement of said stripes along said path, means for sensing the position of said array relative to the said stripes of a predetermined color, means responsive to said sensing means for moving said array into a predetermined relationship with said stripes, a sound transducer located along said path for producing an audio signal in response to signals recorded on said track, and means responsive to the passage of the sprockets in said strip past a predetermined location along said path for generating synchronization signals to indicate the location of sequential frames of photographically recorded images on said film.

3. In combination with a color television receiver of the type employing a one-gun sequential phosphor stripe receiving tube, said television receiver having a beam deflection system for establishing the position of an electron beam on the face of the tube and a video output amplifier for controlling the intensity of an electron beam produced by said gun, and means for marking the position of a beam on the tube relative to phosphor stripes of different colors on the screen; switching means having first and second states, means controlled by said switching means in its first state and responsive to broadcast television signals for applying signals to said deflection system and to said output amplifier for producing a conventional television display, and projection signal generating means for applying signals from a strip of motion picture film of the type comprising a repetitive series of parallel filter stripes of different colors to said amplifier and said deflection system in said second position of said switch, said projection signal generating means comprising means for moving a strip of film along a predetermined path in a direction parallel to the filter stripes on the film, a linear photoresponsive array of signal generating means, means mounting said array along said path normal to the direction of movement of said stripes, means responsive to the position of the photoresponsive signal generating means of said array relative to the filter stripes of the film for maintaining the photoresponsive signal generating means of the array and the filter stripes in registration, and means synchronized with said deflection system for strobing said video signals to said amplifier in correspondence with the position of said beam relative to corresponding filter stripes on said screen.

4. In combination with a color television receiver having a cathode ray tube of the one-gun sequential type employing a screen with a series of sets of differently color-emissive phosphor stripes, deflection means responsive to applied synchronization signals for producing a raster in said tube, and video signal responsive means for modulating said raster to produce a visible display, a slit source of light, an elongated array of linear photoresponsive signal producing means, means mounting said source and said array in confronting relationship, means for moving an elongated strip of motion picture film between said source and said array, and being intended for use with a film strip having a repetitive series of parallel filter strips of different colors running in the direction of elongation of the strip and bearing transparency images between said source and said array, means responsive to the movement of the film for applying deflection signals to said deflection means, distributing means for applying video signals from the signal producing means of said array to said video signal responsive means, and means responsive to the position of the photoresponsive signal generating means of said array relative to the filter strips of the film for maintaining the photoresponsive signal generating means of the array and the filter stripes in registration.

5. In a sound motion picture projector adapted for use with a film strip bearing a repetitive series of parallel filter stripes of different colors running in the direction of elongation of the strip and bearing transparency images and a recorded sound track, there being a constant frequency pilot signal recorded with the audio signal on the track, means for mounting a strip of such film for movement along a predetermined path, transducer means for reproducing audio signals recorded on said track, means responsive to the pilot signal component of said reproduced signal for moving said film along said path at a predetermined constant speed, a photo-responsive detector array having a photoresponsive storage element for each picture element and aligned to be mounted adjacent said path to respond to light passing through the film along the path and produce sets of signals representing picture elements, means responsive to the position of the photoresponsive elements of the array relative to the filter stripes of the film for maintaining the photoresponsive elements and the filter stripes in registration, and means responsive to the passage of sprocket holes in said film along said path for producing synchronizing signals.

6. In combination with a linear photoresponsive storage array comprising a photoresponsive storage element for each picture element in a line to be projected, at least one additional photoresponsive element in fixed relation to said array, means adjustably mounting said array for movement back and forth along a predetermined line, means for moving a strip of film along a predetermined path perpendicular to said line adjacent said array, a light source, means for focusing light from said source onto said array through a film moving along said path, means responsive to the color of light falling on said additional detector for adjusting the position of said array along said predetermined line.

7. A sound motion picture projector for use with an elongated strip of motion picture film bearing a sound recording track and comprising photographic images on a matrix comprising contiguous parallel filter strips in sets of different colors in a repetitive series across the film and parallel to the direction of elongation of the film, said projector comprising, a color television receiving tube having a single electron gun and a screen bearing phosphor stripes in repetitive parallel sets of different emissive types each bearing a predetermined correspondence to a different colored filter stripe on the film, video amplifying means responsive to an applied video signal and connected to said gun for producing an electron beam having an intensity determined by the amplitude of said video signal, deflection means for moving said beam in a predetermined raster on said screen, means for detecting the position of said beam relative to said phosphor stripes, means for moving a strip of film of the aforesaid kind along a predetermined path at substantially constant speed, transducer means mounted along said path and responsive to a sound signal recorded on the sound track of the film for producing an audio signal, a speaker, amplifying means responsive to said audio signal for energizing said speaker, linear scanning means, means adjustably mounting said scanning means along said path perpendicular to the direction of movement of the film for producing video signals from the film under the control of said deflection means, means for applying said video signal to said video amplifying means, and means for sensing the position of the filter stripes on the film relative to said array for adjusting the position of said array to bring the video signals produced by said scanning means into color correspondence with said phosphor stripes.

8. A video signal generator for use with color film comprising a repetitive series of filter stripes in sets of different colors arranged in a parallel contiguous array across the surface of the film, said signal generator comprising a linear array of photoresponsive storage elements comprising a first set of at least one such storage element for each filter stripe on the film in a frame to be projected and at least two additional elements, an output terminal, electronic scanning means responsive to a sequence of applied signals for sequentially coupling said detector elements to said output terminal, means for moving a strip of the film past said array in a direction parallel to the stripes on the film, optical means for focusing an image of an element of each of said stripes in a line across said film having a length equal to the width of an image frame on a different one of said first set of storage elements and an image of a region on said film beyond said line on said two additional storage elements, and means controlled by said additional elements and responsive to the colors of said images on said additional elements for moving said array along said line to register predetermined storage elements in said array with filter stripes of a predetermined color on the film.

9. Apparatus for producing video signal from a strip of color transparency film of the type comprising a repetitive series of parallel filter strips of different colors, said apparatus comprising, means for moving a strip of such film along a predetermined path in a direction parallel to the filter stripes on the film, a linear photoresponsive array of signal generating means, one signal generating means for each of a set of the filter stripes, means adjustably mounting said array adjacent said path for limited movement along a line perpendicular to the filter stripes, means for illuminating said array through the film strip, means for detecting the order of registration of light through filter stripes of different colors falling on the particular signal generating means of said array, and means controlled by said detecting means for adjusting the position of said array along said line to align filter stripes of a predetermined color with predetermined elements of said array.

10. Apparatus for producing a video signal from a strip of additive color transparency film of the type comprising a repetitive series of parallel filter stripes of different colors, said apparatus comprising, means for moving said strip along a predetermined path in a direction parallel to said stripes, a linear photoresponsive array of signal generating means, one signal generating means for each of a set of said stripes, means adjustably mounting said array adjacent said path and perpendicular to the direction of movement of said stripes along said path, means for sensing the position of said array relative to the said stripes of a predetermined color, and means responsive to said sensing means for moving said array into a predetermined relationship with said stripes.

11. In combination with a color television receiver having a cathode ray tube of the one-gun sequential type having a series of sets of differently color-emissive phosphor stripes, deflection means responsive to applied synchronization signals for producing a raster in said tube, and video signal responsive means for modulating said raster to produce a visible display, a slit source of light, an elongated array of linear photoresponsive signal producing means, means mounting said source and said array in confronting relationship, means for moving an elongated strip of motion picture film having a repetitive series of parallel filter strips of different colors running in the direction of elongation of the strip and bearing transparency images between said source and said array, means responsive to the movement of said film for applying deflection signals to said deflection means, distributing means for applying video signals from the signal producing means of said array to said video signal responsive means, and means responsive to the position of the photoresponsive signal producing means of said array relative to the filter stripes of the film for maintaining the photoresponsive signal producing means and the filter stripes in registration to effect a predetermined correspondence between the colors of the stripes on the film and the colors of emission of said phosphor stripes.

12. A photoelectric system for producing video and synchronization signals from a strip of film on which a photographic transparency is recorded, the film being of the type comprising a repetitive series of color filter stripes, comprising a slit source of light, a linear array of photodetectors, distributing means responsive to a series of applied electronic scanning signals for sequentially interrogating said photodetectors to produce a video signal, means for moving the strip of film between said source and said array to modulate the light passing from said source to said array, means responsive to the position of the photodetectors of said array relative to the filter stripes of the film for maintaining the photodetectors and the filter stripes in registration, means responsive to the movement of the film relative to said array for producing a series of synchronizing pulses at predetermined increments of film movement, signal generating means responsive to said synchronizing pulses for producing a group of scanning signals for each synchronizing pulse, and means enabled during each scanning signal for applying said series of signals to said distributing means.

13. Signal generating apparatus for use with a strip of photographic film on which a series of photographic images are formed superimposed on a parallel array of filter stripes in repetitive sets of different colors, and which film is formed with a series of sprocket holes in positions correlated with the locations of said images, comprising film speed control means for moving said film over a predetermined path at a substantially constant speed, means forming a slit source of light adjacent and transverse to said path on a first side of said path, a linear array of photoresponsive signal generating elements located on a second side of said path opposite said first side and confronting said array, means for focusing an image of a line on the film illuminated by said source onto said array, a terminal, distributing means responsive to a series of applied signals for sequentially applying signals produced by said elements to said terminal, signal generating means located at a predetermined point on said path for producing a synchronizing signal in response to the passage of each sprocket hole past said point, first sweep signal generating means responsive to each synchronizing signal for producing a first scanning signal of continually varying amplitude, second sweep signal generating means responsive to each synchronizing signal for producing a group of second scanning signals for continually varying amplitude for each first scanning signal, third signal producing means enabled during at least a portion of each second scanning signal to apply said series of signals to said distributing means, and means responsive to the position of the photoresponsive elements of said array relative to the filter stripes of the film for maintaining the photoresponsive elements and the filter stripes in registration.

14. In combination with a one-gun sequential phosphor stripe color television receiving tube, beam deflection means for establishing the position of an electron beam on the face of said tube, video output amplifying means for controlling the intensity of an electron beam produced by said gun, means for marking the position of a beam on the tube relative to phosphor stripes of different colors on the screen, and projection signal generating means for applying signals from a strip of motion picture film of the type comprising a repetitive series of parallel filter stripes of different colors to said amplifying means and said beam deflection means in said second position of said switch, said projection signal generating system comprising means for moving a strip of film along a predetermined path in a direction parallel to the filter stripes on the film, a linear photoresponsive array of signal generating means, means mounting said array along said path normal to the direction of movement of said stripes, means responsive to the position of the photoresponsive signal generating means of said array relative to the filter stripes of the film for maintaining the photoresponsive signal generating means and the filter stripes in registration, and means synchronized with said deflection system for strobing said video signals to said amplifier in correspondence with the position of said beam relative to corresponding filter stripes on said screen.

15. In combination with a one-gun sequential phosphor stripe color television receiving tube, beam deflection means for establishing the position of an electron beam on the face of said tube, video output amplifying means for controlling the intensity of an electronic beam produced by said gun, means for marking the position of a beam on the tube relative to phosphor stripes of different colors on the screen, switching means having first and second states, means controlled by said switching means in its first state and responsive to broadcast television signals for applying signals to said deflection system and to said output amplifier for producing a conventional television display, and projection signal generating means for applying signals from a strip of motion picture film of the type comprising a repetitive series of parallel filter stripes of different colors to said amplifying means and said beam deflection means in said second position of said switch, said projection signal generating system comprising means for moving a strip of film along a predetermined path in a direction parallel to the filter stripes on the film, a linear photoresponsive array of signal generating means, means mounting said array along said path normal to the direction of movement of said stripes, means responsive to the position of the photoresponsive signal generating means of said array relative to the filter stripes of the film for maintaining the photoresponsive signal generating means of the array and the filter stripes in registration, and means synchronized with said deflection system for strobing said video signals to said amplifying means in correspondence with the position of said beam relative to corresponding filter stripes on said screen.

16. In combination with a cathode ray tube of the one-gun sequential type employing a screen with a series of sets of differently color-emissive phosphor stripes; deflection means responsive to applied synchronization signals for producing a raster in said tube; video signal responsive means for modulating said raster to produce a visible display, a slit source of light; an elongated array of linear photoresponsive signal producing means; means mounting said source and said array in confronting relationship; means for moving an elongated strip of motion picture film, having a repetitive series of parallel filter stripes of different colors running in the direction of elongation of the strip, and bearing transparency images, between said source and said array; means responsive to the movement of the film for applying deflection signals to said deflection means; distributing means for applying video signals from the signal producing means of said array to said video signal responsive means; and means responsive to the position of the photoresponsive signal generating means of said array relative to the filter stripes of the film for maintaining the photoresponsive signal generating means of the array and the filter stripes in registration to efffect a predetermined correspondence between the colors of the stripes on the film an the colors of emission of said phosphor stripes.

17. In a sound motion picture projector adapted for use with an elongated film strip bearing color photographic images and recorded sound track, there being a constant frequency pilot signal recorded on the track, and there being a repetitive series of parallel filter stripes of different colors on the film strip running in the direction of elongation of the strip, means for mounting a strip of such film for movement along a predetermined path, transducer means for reproducing the pilot signal on said track, means responsive to said reproduced pilot signal for moving said film along said path at a predetermined constant speed, a photoresponsive detector array having a photoresponsive storage element for each picture element and aligned to be mounted adjacent said path to respond to light passing through the film along the path and produce sets of signals representing picture elements, means responsive to the position of the elements of said array relative to the position of the filter stripes of the film for maintaining the photoresponsive elements and the filter stripes in registration, and means responsive to the passage of sprocket holes in said film along said path for producing synchronizing signals.

18. In combination with a linear photoresponsive storage array comprising a photoresponsive storage element for each picture element in a line to be projected, at least two additional photoresponsive elements in fixed relation to said array, means adjustably mounting said array for movement back and forth along a predetermined line, means for moving a strip of film along a predetermined path perpendicular to said predetermined line adjacent said array, a light source, means for focusing light from said source onto said array through a film moving along said path, and means responsive to the color of light falling on said additional detector elements for adjusting the position of said predetermined array along said line.

19. A motion picture projector for use with an elongated strip of motion picture film bearing photographic images on a matrix comprising continuous parallel filter stripes in sets of different colors in a repetitive series across the film and parallel to the direction of elongation of the film, said projector comprising a cathode ray display tube having a single electron gun and a screen bearing phosphor stripes in repetitive parallel sets of different emissive types each bearing a predetermined correspondence to a different colored filter stripe on the film, video amplifying means responsive to an applied video signal and connected to said gun for producing an electron beam having an intensity determined by the amplitude of said video signal, deflection means for moving said beam in a predetermined raster on said screen, means for detecting the position of said beam relative to said phosphor stripes, means for moving a strip of film of the aforesaid kind along a predetermined path at substantially constant speed, linear scanning means, means adjustably mounting said scanning means along said path perpendicular to the direction of movement of the film for producing video signals from the film under the control of said deflection means, means for applying said video signal to said video amplifying means, and means for sensing the position of the filter stripes on the film relative to said array for adjusting the position of said array to bring the video signals produced by said scanning means into color correspondence with said phosphor stripes.

20. A video signal generator for use with color film comprising a repetitive series of filter stripes in sets of different colors arranged in a parallel contiguous array across the surface of the film, said signal generator comprising a linear array of photoresponsive storage elements comprising at least one such storage element for each filter stripe on the film in a frame to be projected, an output terminal, electronic scanning means responsive to a sequence of applied signals for sequentially coupling said detector elements to said output terminal, means for moving a strip of the film past said array in a direction parallel to the strips on the film, optical means for focusing an image of an element of each of said stripes in a line across said film having a length equal to the width of an image frame on a different one of said storage elements, and means responsive to the position of the photoresponsive elements of the array relative to the filter stripes of the film for maintaining the photoresponsive elements and the filter stripes in registration.

21. Color television apparatus for projecting color pictures from an elongated strip of film having transparency images disposed therealong and a repetitive series of parallel filter stripes of different colors extending lengthwise of said elongated strip in overlying relationship to said transparency images, said apparatus comprising:
 a selectively energizeable slit source of light;
 means for progressively advancing the elongated film strip lengthwise past said slit source of light with its stripes disposed substantially perpendicular to said slit source of light;
 a linear array of photoresponsive signal producing elements, said linear array extending in confronting substantially parallel alignment with said slit source of light on the opposite side of the elongated film strip from said slit source of light, said linear array including one said photoresponsive signal producing element for each of the color stripes on the elongated film strip which is responsive to the light from said slit source of light after it passes through a select one of the color stripes;
 at least one cathode ray tube;
 deflection means responsive to applied synchronization signals for producing a raster in said tube;
 means responsive to the movement of the elongated film strip for applying synchronization signals to said deflection means; and
 means responsive to said signal producing elements for modulating said raster to produce a visible display of the images on the elongated film strip.

22. The apparatus of claim 21 additionally including means for automatically maintaining alignment of each said photoresponsive signal producing element with its associated color stripe during the advancement of the elongated film strip past said slit source of light.

23. The apparatus of claim 22 wherein said alignment maintaining means includes at least one additional photoresponsive signal producing element connected to said linear array and disposed to receive light from said slit source after it passes through the elongated film strip, means for adjustably mounting said array for reversible movement in the direction of its length and means responsive to the color of light incident upon said additional photoresponsive signal producing element for automatically displacing said linear array in the direction of its length.

* * * * *